Patented Oct. 24, 1933

1,932,178

UNITED STATES PATENT OFFICE

1,932,178

SULPHONATED CARBOXYLIC ACID AMIDES AND THEIR PREPARATION

Fritz Guenther, Hermann Holsten, and Karl Saftien, Ludwigshafen-on-the-Rhine, Germany, assignors to I. G. Farbenindustrie Aktiengesellschaft, Frankfort - on - the - Main, Germany No Drawing. Application April 13, 1932, Serial No. 605,112, and in Germany May 30, 1930

15 Claims. (Cl. 260—124)

The present invention relates to the production of assistants for the textile and related industries, in particular of wetting, cleansing, dispersing and like agents.

We have found that particularly efficient wetting, cleansing, dispersing and like agents can be obtained by acting on mineral acid esters derived from carboxylic amides containing an aliphatic, i. e. an open-chain aliphatic or cycloaliphatic, radicle of more than 5, preferably more than 10, carbon atoms in the molecule with neutral sulphites, preferably alkali sulphites, that is sodium, potassium, lithium or ammonium sulphites. Mineral acid esters of the said amides are for example sulphuric acid, phosphoric acid or halogen hydracid esters, especially hydrobromic and hydrochloric acid esters of the said amides. The reaction is generally carried out while warming to from about 50° to about 250° C., preferably to from about 80° to about 150° C., in order to accelerate it and if desired in a closed vessel.

The preparation of the said mineral acid ester may be effected for example by converting into an amide a carboxylic acid which already contains one or more mineral acid ester groups in the molecule or by subsequently introducing mineral acid ester groups into carboxylic acid amides. The introduction of mineral acid ester groups into carboxylic acids or carboxylic acid amides may be carried out in the usual manner by an esterfication of hydroxy-carboxylic amides or by adding halogen, halogen hydracids or sulphonic acid to unsaturated linkages of the carboxylic acids, or radicles thereof in the amides as for example of crotonic acid, maleic acid, fumaric acid or undecenic acid. Similarly halogen atoms can be introduced into aliphatic saturated, carboxylic acids or amides thereof. In about the same way the mineral ester groups may be introduced into the amine radicles of the amides, so that after the reaction according to the present invention the sulphonic acid radicles will be situated in the amine radicle of the amide. In most cases, however, the mineral esters having the mineral ester radicle connected to the carboxylic acid radicle of the amides will be preferred.

For example acid amides may be prepared in known manner from the halides, anhydrides or esters of aliphatic carboxylic acids containing one or more halogen atoms, especially those containing one halogen atom such as mono-chloracetic acid, mono-bromacetic acid, alpha-chlorpropionic acid, alpha-chlorbutyric acid, alpha-bromo-capric acid, alpha-bromolauric acid, alpha-bromomyristic acid, alpha-bromopalmatic acid or alpha-bromostearic acid or of cycloaliphatic carboxylic acids such as naphthenic acids or of aromatic, hydroxy-carboxylic acids such as orthohydrogen-benzoic acid, and on the other hand, ammonia or any primary or secondary aliphatic, cycloaliphatic, mixed aliphatic-aromatic or aromatic amines, such as methyl amine, mono- or dialkylol amines, as for example ethanol or propanol amines, n-butyl amines, dodecyl amine, tetradecyl amine, octodecyl amine, cyclohexylamine, benzylamine, aniline, monomethylamiline and like amines containing at least 1 hydrogen atom connected to the nitrogen atom. A sulphuric ester group may be introduced into the amides of hydroxy carboxylic acids, as for example lactic acid, by a treatment of the amides with chlorsulphonic acid.

The conversion of the said mineral acid esters with the said sulphites is preferably effected in solution or suspension in aqueous media inert to the sulphites and therefore free from free mineral acid and while heating to the aforesaid temperatures, whereby in many cases it is advantageous to work in closed vessels, e. g. under pressure even on working below 100° C. when solvents boiling below 100° C. be present. Water is especially suitable as the medium, in certain cases it is favorable to add to the water solubilizing substances, that is water-soluble substances facilitating dissolution, as for example methyl alcohol, ethyl alcohol, acetone or dioxane, whereby the conversion is accelerated, and emulsifying agents, such as a soap, Turkey-red oils or water-soluble salts of sulphonic acids of aromatic or aliphatic compounds containing at least 6, preferably more than 9, carbon atoms; it is especially advantageous to employ for the said purpose small amounts of the alkali salts of the sulphonic acids obtainable according to the present invention.

The amides of aliphatic alpha-halogen carboxylic acids may be brought into reaction in a particularly smooth manner with the said salts of sulphurous acid. Boiling for from 1 to 2 hours with an aqueous solution of sodium sulphite with an addition of ethyl alcohol is often sufficient to cause a practically quantitative conversion.

The resulting products, by reason of their excellent wetting, cleansing and dispersing power, are suitable for a great variety of purposes of daily and industrial use. They are especially valuable as assistants in the textile, leather and paper industries in which they may be used for a great many purposes. They may be employed either alone or together with various additions such as salts, acids, alkalies, glue, solvents, as for example trichlorethylene, carbon tetrachloride, cyclohexanol or ethyl alcohol and/or oils of mineral, animal or vegetable origin. Especially valuable products for wetting and scouring purposes are the sulphonic acids obtained from amines containing an aliphatic chain of more than 10 carbon atoms, such as mono-dodecyl amine, mono-tetradecyl amine and mono-oleyl amine, and aliphatic carboxylic acids containing up to 4 carbon atoms, such as acetic acid. On the other hand, those obtainable from N-mono-alkylated aromatic amines, such as N-ethyl- or N-methyl-aniline and fatty acids containing from 12 to 18 carbon atoms, such as lauric, palmitic and stearic acid, are equally valuable as wetting agents, the amides from carboxylic acids with more than 14 carbon atoms possessing, however, an increased scouring property. The pure products obtainable according to the process of the present invention correspond to the general formula

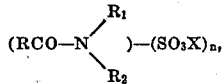

in which RCO- denotes a radicle of a carboxylic acid, $R_1$ and $R_2$ denote hydrogen or organic radicles and X hydrogen or an alkali radicle, at least one of the radicles RCO-, $R_1$ or $R_2$ containing an aliphatic chain of at least 5 carbon atoms, $n$ being an integral number of at least 1 and the group -$SO_3X$ being fixed to a C-atom of the groups RCO, $R_1$ or $R_2$. RCO-, which is a radicle of a carboxylic acid, may be for example the radicle of an aromatic or aliphatic, i. e. open-chain aliphatic or cyclo-aliphatic, carboxylic acid; the organic radicles $R_1$ and $R_2$ may be hydrocarbon radicles, for example aliphatic, i. e. aliphatic open-chain or cyclo-aliphatic, hydrocarbon radicles or hydroxyalkyl radicles. The said products are usually obtained in admixture with the alkali salts of the mineral acids corresponding to the mineral acid esters employed as the initial materials.

If desired, the products corresponding to the above formula may be converted into salts of earth metals that is of alkaline earth metals such as calcium, barium or strontium including magnesium, or light earth metals such as aluminium.

The following examples will further illustrate how this invention may be carried out in practice but the invention is not restricted to these examples. The parts are by weight.

*Example 1*

345 parts of the octodecyl amide of chloracetic acid ($CH_2Cl$—CO—NH—$C_{18}H_{37}$) (obtainable by the interaction of octodecylamine with chloracetyl chloride in solution in di-methyl aniline) are introduced into a solution of 150 parts of sodium sulphite in 2000 parts of a 30 per cent aqueous ethyl alcohol. After stirring for 4 hours at 80° C., the reaction mixture is evaporated to dryness and a good washing and dispersing agent is obtained which consists mainly of the sulphonic acid

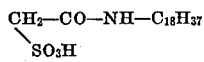

in admixture with sodium chloride.

*Example 2*

70 parts of an amide which has been prepared by the conversion of a mixture consisting mainly of dodecylamine and tetradecylamine with chloracetyl chloride in solution in dimethyl aniline are refluxed for 2 hours with a solution of 35 parts of sodium sulphite in 350 parts of a 30 per cent aqueous ethyl alcohol. An excellent washing and wetting agent, consisting of a mixture of sodium chloride and a product corresponding to the formula

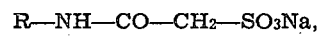

in which R is partly $C_{12}H_{25}$ and partly $C_{14}H_{29}$, is obtained which may be readily recovered in an anhydrous form by evaporation of the aqueous alcoholic solution.

*Example 3*

60 parts of alpha-bromolauric acid ethyl anilide

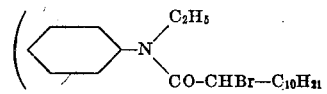

obtainable by the interaction of alpha-bromolauric acid chloride with ethyl aniline) are heated for 24 hours in an autoclave at from 120° to 130° C. with an addition of 30 parts of sodium sulphite and 400 parts of a 30 per cent aqueous ethyl alcohol solution. The alcohol is then removed by heating in an open vessel and 500 parts of water are then added to the remaining mixture. The resulting turbid solution is treated with diethyl ether in order to dissolve therein any water- insoluble impurities. The limpid aqueous solution thus obtained is evaporated to dryness and the dry residue is extracted with ethyl alcohol. A product having an excellent wetting and foaming power is obtained, which contains practically no sodium bromide and which corresponds to the formula

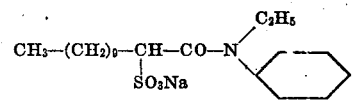

*Example 4*

70 parts of alpha-bromopalmitic acid amide are heated for 16 hours in an autoclave at about 150° C. with an addition of 35 parts of sodium sulphite and 400 parts of a 30 per cent aqueous ethyl alcohol solution. The reaction mixture is then evaporated to dryness, any water-insoluble by-products being then extracted by means of carbon tetrachloride. The reaction product is then dissolved in boiling about 95 per cent ethyl alcohol, the alcoholic solution is filtered off and evaporated to dryness. The water-soluble sodium salt of a sulphonic acid thus obtained probably corresponds to the formula:

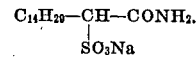

The product is an excellent washing and scouring agent.

*Example 5*

77 parts of alpha-bromopalmitic acid ethyl anilide

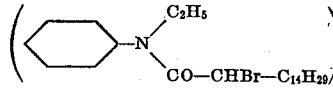

are heated for 16 hours in an autoclave at about 150

150° C. with an addition of 35 parts of sodium sulphite and 400 parts of a 30 per cent aqueous ethyl alcohol solution. The bulk of the alcohol is then removed by heating to about 100° C. and water is added to the remaining mixture. The aqueous solution is mixed with diethyl ether; three layers are thus formed, the upper ethereal layer containing water-insoluble impurities, the lower, aqueous layer containing sodium bromide and the middle layer containing the sodium salt of the reaction product. The middle layer is separated and evaporated to dryness; a very good washing and scouring agent is thus obtained which probably corresponds to the formula:

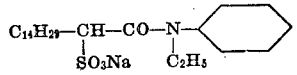

What we claim is:—

1. The process for the production of assistants for the textile and related industries which comprises reacting an alakali sulphite with a mineral acid ester, derived from a carboxylic amide containing an aliphatic radicle with more than 5 carbon atoms.

2. The process for the production of assistants for the textile and related industries which comprises reacting an alkali sulphite with a mineral acid ester, derived from a carboxylic amide containing an aliphatic radicle with more than 5 carbon atoms, in the presence of an aqueous liquid inert to the said sulphite.

3. The process for the production of assistants for the textile and related industries which comprises heating at from about 50° to about 250° C. a mineral acid ester, derived from a carboxylic amide containing an aliphatic radicle with more than 5 carbon atoms, with an alkali sulphite in the presence of an aqueous liquid inert to the said sulphite.

4. The process for the production of assistants for the textile and related industries which comprises heating at from about 50° to about 250° C. a mineral acid ester, derived from a carboxylic amide containing an aliphatic radicle with more than 5 carbon atoms, with an alkali sulphite in the presence of an aqueous liquid inert to the said sulphite and containing a solubilizing substance.

5. The process for the production of assistants for the textile and related industries which comprises heating at from about 50° to about 250° C. a mineral acid ester, derived from a carboxylic amide containing an aliphatic radicle with more than 5 carbon atoms, with an alkali sulphite in the presence of an aqueous liquid inert to the said sulphite and containing an emulsifying agent.

6. The process for the production of assistants for the textile and related industries which comprises heating at from about 50° to about 250° C. a mineral acid ester, derived from a carboxylic amide containing an aliphatic radicle with more than 5 carbon atoms, with an alkali sulphite in the presence of an aqueous liquid inert to the said sulphite and containing an alkali salt of a sulphonic acid of a carboxylic amide containing an aliphatic radicle with more than 5 carbon atoms.

7. The process for the production of assistants for the textile and related industries which comprises heating at from about 50° to about 250° C. a carboxylic amide of a mineral acid ester of a carboxylic acid, which amide contains an aliphatic radicle with more than 5 carbon atoms, with an alkali sulphite.

8. The process for the production of assistants for the textile and related industries which comprises heating at from about 50° to about 250° C. a mineral acid ester, derived from a carboxylic amide containing an aliphatic radicle with more than 5 carbon atoms, with sodium sulphite.

9. The process for the production of assistants for the textile and related industries which comprises heating at from about 50° to about 250° C. a carboxylic amide of an alpha-mineral acid ester of a carboxylic acid, which amide contains an aliphatic radicle with more than 5 carbon atoms, with a neutral alkali sulphite.

10. The process for the production of assistants for the textile and related industries which comprises heating at from about 50° to about 250° C. an alpha-halogen-carboxylic amide containing an aliphatic radicle with more than 5 carbon atoms with a neutral alkali sulphite.

11. The process for the production of assistants for the textile and related industries which comprises heating at from about 50° to about 250° C. a carboxylic amide of a mineral acid ester of an aliphatic carboxylic acid containing more than 5 carbon atoms, with a neutral alkali sulphite.

12. The process for the production of assistants for the textile and related industries which comprises warming a mineral acid ester, derived from a carboxylic amide containing an aliphatic radicle with more than 5 carbon atoms in the amido group, with a neutral alkali sulphite.

13. Alpha-sulphonic carboxylic amides corresponding to the general formula

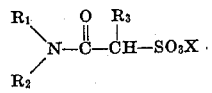

in which X denotes hydrogen, an alkali metal, or a combining equivalent of an alkaline earth or light earth metal, $R_1$ and $R_2$ denote hydrogen, alkyl or an aromatic hydrocarbon radicle of the benzene series, $R_3$ denotes alkyl, which alkyl and aromatic radicles of the benzene series may be further substituted by sulphonic radicles, at least one of the radicles $R_1$, $R_2$ or $R_3$ being an aliphatic chain containing at least 5 carbon atoms.

14. Alpha-sulphonic carboxylic amides corresponding to the formula

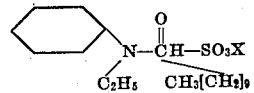

in which X denotes hydrogen or an alkali metal.

15. Alpha-sulphonic carboxylic amides corresponding to the formula

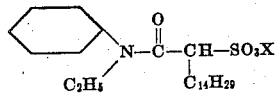

in which X denotes hydrogen or an alkali metal.

FRITZ GUENTHER.
HERMANN HOLSTEN.
KARL SAFTIEN.

Certificate of Correction

Patent No. 1,932,178.　　　　　　　　　　　　　　　October 24, 1933.

FRITZ GUENTHER, ET AL.

It is hereby certified that error appears in the printed specification of the above-numbered patent requiring correction as follows: Page 1, line 34, for "sulphonic" read *sulphuric*; and line 69, for "monomethylamiline" read *monomethylaniline*; page 3, line 22, claim 1, for "alkali" read *alkali*; and lines 130 to 134, claim 14, strike out the formula and insert instead:

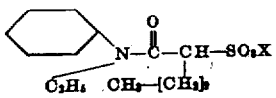

and that the said Letters Patent should be read with these corrections therein that the same may conform to the record of the case in the Patent Office.

Signed and sealed this 23d day of January, A. D. 1934.

[SEAL.]
　　　　　　　　　　　　　　　　　　　　　　　F. M. HOPKINS,
　　　　　　　　　　　　　　　　　　　　　　*Acting Commissioner of Patents.*